Jan. 26, 1954 W. NEUGEBAUER ET AL 2,667,415
PROCESS FOR PRODUCING POSITIVE PHOTOLITHOGRAPHIC
PRINTING FOILS
Filed Jan. 13, 1949
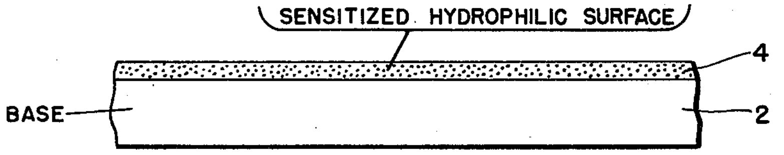
FIG. I
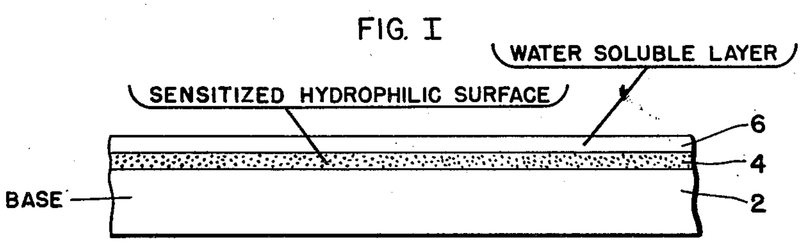
FIG. II
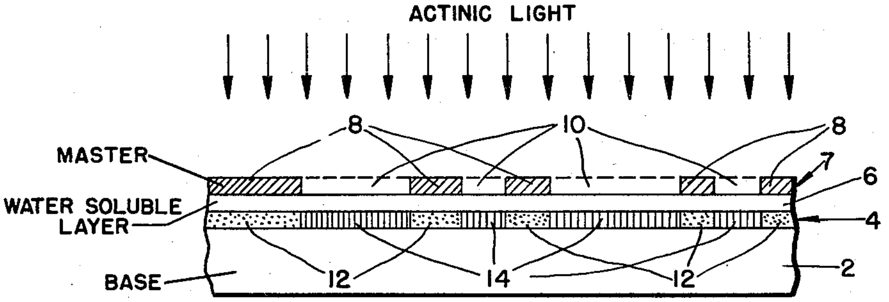
FIG. III
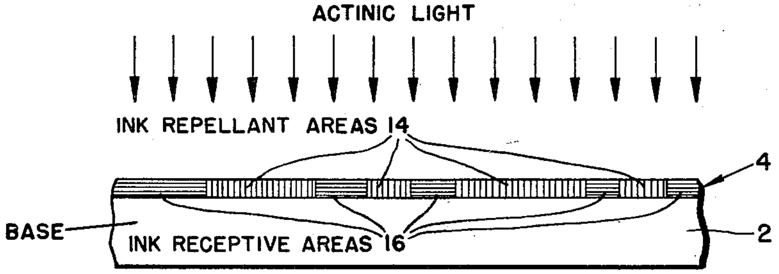
FIG. IV
INVENTORS
Wilhelm Neugebauer
Jakob Barthenheier
by Pierce, Scheffler & Parker
their ATTORNEYS Patented Jan. 26, 1954

2,667,415

UNITED STATES PATENT OFFICE 2,667,415

PROCESS FOR PRODUCING POSITIVE PHOTOLITHOGRAPHIC PRINTING FOILS

Wilhelm Neugebauer, Wiesbaden-Biebrich, and Jakob Barthenheier, Eddersheim am Main, Germany, assignors, by mesne assignments, to Azoplate Corporation, Summit, N. J., a corporation of New Jersey Application January 13, 1949, Serial No. 70,803

Claims priority, application Germany October 15, 1948

9 Claims. (Cl. 95—5.4)

This invention relates to a process of producing positive printing foils and plates for flat and offset printing and to new photo-lithographic printing foils which are of use in the new process.

The pending application for Letters Patent Serial No. 55,228 which was filed on October 18, 1948, in the name of W. Neugebauer, J. Barthenheier and A. Rebenstock relates to a process of producing negative paper printing foils for lithographic purposes. Photo-sensitive diazo compounds of higher molecular weight, e. g. condensation products of formaldehyde and the diazo compound of p-amino-diphenylamine, are used in the light sensitive layer. Also proposals have been made to incorporate diazo compounds of higher molecular weight, for example, the above mentioned formaldehyde condensation product, into regenerated cellulose which may be used in the form of a foil or in the form of a surface layer on cellulose ester foils. The layer may be formed, for example, by superficially saponifying the cellulose ester foil. It is essential for the effect, that the base to be sensitized has a hydrophilic surface, and so it is to be understood that polyvinylester foils, e. g. polyvinylacetate films, also represent a suitable base for the production of photolithographic printing foils, if they are saponified on their surface.

The light sensitive layer is produced by soaking or brushing the hydrophilic foil with a solution of the diazo compound. If foils are photosensitized in this manner, exposed to light under an original, subsequently washed with water and then smeared with a fatty ink, the foils take on the fatty ink at all areas which were struck by the light, i. e. the areas which were not protected by the original, while the foil was being exposed. The areas of the foil which have not been struck by the light repel the fatty ink. Hence, it follows, that the foils just now described are transformed by exposure to light under a positive original into a negative printing foil or plate which will produce negative images. By exposure to light under a negative original, a positive printing foil or plate producing positive images is formed.

Diazo compounds suitable for sensitizing the foils are the diazo compounds of higher molecular weight corresponding with the general formula $$R—Y—Ar—N_2—X$$

wherein

R means an aryl, aralkyl, a higher alkyl or an aroyl residue,

Y means O, S, NH or $NR_1$ $R_1$ standing for alkyl, aralkyl or aryl,

Ar means an aromatic residue, and

X an equivalent of an anion of an acid.

Under the term "aroyl" we understand the acyl radicals of aromatic carboxylic acids, e. g. benzoyl, and the expression "equivalent of an anion of an acid" is intended to designate radicals such as Cl—, $\frac{1}{2}SO_4=$, $\frac{1}{2}ZnCl_4=$, $C_6H_5SO_3$ and the like.

The substituent Y and the diazo group $N_2$ may preferably be in a para-position to each other. The aromatic residue Ar, the group R and the NH-group may contain further substituents. In most cases it is advantageous, that the residues R and Ar are substituted by alkoxy, aroxy or N-aryl-sulfamido groups or by one or more halogen atoms. When using a diazo compound of the formula

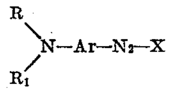

as above defined, the substituents R and $R_1$ can be connected with one another to form a cyclic compound, or R or $R_1$ can be connected with Ar by a covalent linkage, but it is not desirable to have sulfo groups as substituents in any of R, $R_1$ and Ar.

In order to illustrate the above general formula by examples, we name the diazo compounds of the following amines: 1 - amino - 4 - (N - ethyl-benzyl)-aniline, 4 - (N - cyclohexyl) - amino-aniline, 4-(N-2,6-dichlorobenzyl)-amino-aniline, 4′,3,6-tribrom-4-amino-diphenylamine, 4-amino-3,6 - dimethoxy - diphenylamine - 2′ - carboxylic acid, 4-amino-2-sulfamido-(2,5-hydrochinon- diethylether)-diphenylamine of the formula

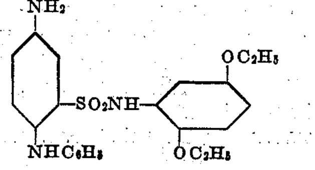

1 - amino - 4 - (benzoyl - amino) - 2 - phenoxy-5 - toloxy - benzene, 4 - amino - 2,5,4' - triethoxy-diphenylether, 4 - amino - 2,5 - di - n - propoxy-4'-methyl-diphenylsulfide and N-(2,6-dichloro-benzyl)-3-amino-carbazol.

The diazo compounds, when acted upon with an aldehyde, for example, formaldehyde, are transformed into condensation products which are also suitable for sensitizing the foil.

Instead of the diazo compounds and the above mentioned aldehyde condensation products themselves one may use the sulfonates of these diazo compounds, which can be prepared in known manner by reaction of the diazo compounds with sulfites. Furthermore the corresponding diazo amino compounds can be used which are produced by causing the diazo compounds and their aldehyde condensation products respectively to react with amines following well-described methods. Also colorless diazo compounds may be used.

It is the object of our present invention to modify the above described photo-sensitized foils, which have a hydrophilic surface containing therein diazo compounds of higher molecular weight, in such a way that the foil, when exposed to light under a positive original, is converted into a positive printing foil or plate from which positive images can be produced. If the foil is exposed to light under a negative original, a negative printing foil or plate which produces negative images is obtained. Also a suitable modification of the process of exposing and developing the exposed foil must be considered as an object of our present invention.

The invention is illustrated by the accompanying drawing in which:

Fig. I is a view in diagrammatic sectional elevation of a light sensitive material of the type described.

Fig. II is a view in diagrammatic sectional elevation of the light sensitive material coated with a water soluble layer.

Fig. III is a view in diagrammatic sectional elevation showing the light sensitive material coated with the water soluble layer being exposed to actinic light through a master.

Fig. IV is a view in diagrammatic sectional elevation of the plate being completely exposed to actinic light after removal of the water soluble layer.

The light sensitive material shown in Fig. I is made up of a base 2 provided with a hydrophilic surface 4, which has been photo-sensitized by means of one of the above mentioned diazo compounds or a corresponding diazo sulfonate and diazo amino compound respectively, is coated with a water soluble layer 6 as shown in Fig. II and dried. As shown in Fig. III, the sensitized hydrophilic surface 4 covered with the water soluble layer 6 is exposed to a light image, formed for example by placing it under a master 7 provided with opaque image areas 8 and light transmitting areas 10. The water soluble layer is removed by means of water and then the material is dried and completely re-exposed to light without using a master as shown in Fig. IV to make the areas 16 (previously covered by the opaque areas 8 of the master 7) receptive to greasy ink. The areas 14 exposed to light through the water soluble layer 6 remain hydrophilic and are ink repellant on the press. The plate or foil produced in this manner when moistened with water and smeared with fatty ink, can be used for producing positive prints.

Various water soluble substances may be applied to the light sensitive layer according to the present invention, which are very different from each other. Good results have been obtained with substances such as gum arabic, cellulose ethers, polyuronic acids or their salts, dextrine, sugar, polyvinyl alcohol, polyvinyl pyrrolidone, water soluble urea resins, protein solutions, polyethyleneoxide, pectin substances, sodium alginate, hydrogum, guar resin, polyphosphates, e. g. sodium metaphosphate, and others. They may by applied either singly or in combination with each other and/or with other substances, e. g. substances which improve the flexibility of the covers. It may be advantageous, to choose water soluble substances which have a neutral or weakly acid reaction. Guar resin is defined in the Journal of the American Chemical Society, vol. 70 (1948), pages 2221 and 2222, as polysaccharide (mannogalactan). Hydrogum is the commercial name used by the Harris-Seybold Company for the mesquite gum which it sells.

After the foil has been exposed to light under an original, and washed with water in order to remove the water soluble substance, it is important to squeeze out the water, immediately, or to separate the excess water by pressing the foil together with filter paper. The exactness of the printed image is improved thereby.

Moreover we have found that the exactness of the images and prints which are produced according to the new process can often be improved considerably by washing off the exposed foils with a salt solution or with a solution containing substances which reduce the solubility of the sensitizing diazo compound or react with the latter to form a difficultly soluble compound. In this connection we mention e. g. aqueous solutions of calcium chloride of between 0.1% and 0.5% content and aqueous solutions of zinc chloride of between 3% and 5% content.

Excellent efficiency in this respect is obtained with substances which possess affinity for the hydrophilic surface layer of the printing foil. Very good results are obtainable, for example, with foils, consisting of paper or having a cellulose surface, if the exposed foil is washed with a dilute solution of substantive salt-like substances or substantive dyestuffs, as examples of which dyestuffs we wish to disclose:

Congo red
Crystal violet
The hydrochloride of 2,3-hydroxynaphthoic acid-N-(β-aminoethyl)-amide
Naphthol ASG
Naphthol ASGR
Naphthol ASL4G
Sodium salt of 4,4'-diaminostilbene-2,2'-disulfonic acid
Sirius light blue G
Tartrazine The non-metallic foils which have been photosensitized by means of diazo compounds and have been coated, according to our present invention, with a film formed of water soluble substances on their light sensitive layer represent a new kind of lithographic printing foils which have good storing qualities and offer the advantage of giving positive images from a positive original.

It is understood, that the new photo-sensitized printing foils can be backed with sheet material, such as metal sheet, paper sheet and plastic sheet, in order to improve the foil's durability in service. This can be done before the exposure to light or after the development of the printing foil. Also coating the back surface of the foil with a water insoluble varnish will have the same effect.

In case that a paper sheet is used as base for the production of the printing foil, an advantage may be found in coating the paper sheet with casein and/or a mineral filler before applying the sensitizing solution, the surface of the paper sheet being greatly smoothed thereby.

The following particulars given by way of example, are intended to illustrate our invention:

(1) An aqueous solution containing 3% of the zinc chloride double salt of the condensation product resulting from the reaction of 1 mol. of the sulfate of 4-diazo-diphenylamine with 1 mol. of paraformaldehyde in sulfuric acid of 60° Bé., is applied by means of a cotton swab to the surface of a cellulose acetate foil which has been saponified superficially. The excess of the sensitizing solution is removed and the dried foil is uniformly treated with an aqueous protein solution, containing 8% of albuminous substance, and dried again. The foil is then exposed to light under a positive original, the exposure being continued until the diazo compounds has faded in the areas not covered by the original. After the exposure of the foil the protein film is washed off. Subsequently, the foil is rinsed with an aqueous solution, containing the dyestuff Siriuslichtblau G, and dried. The dry foil is once more exposed to light, without an original. When the remaining diazo compound has completely faded, the development is finished and an image has been formed which repels water and takes on fatty inks when moist. If the exposure to light was carried out under a positive original, the prints produced by the printing foil will also be positive.

The same good results are obtained, if in the above described example the specific diazo compound is replaced by another of the diazo compounds, indicated in the description, and/or if the water soluble film coating is produced by means of other substances stated to be suitable in column 4 of the description. The same holds true with respect to the use of Siriuslichtblau G which can be substituted by the other dyestuffs or salts or salt-like substances mentioned in column 4.

(2) An aqueous solution containing 3% of the sulfonate of the diazo compound of 4-amino-1-(N-[2,3,4,6-tetrachlorobenzyl])-amino-benzene is brushed on parchment paper and dried. The sensitized surface of the paper foil is treated with a 6% aqueous solution of dextrine, containing 0.8% of phosphoric acid. After drying, the foil is exposed to light and developed, as has been described in Example 1.

The sulfonates of the other diazo compounds, enumerated in the description, and the film-forming water soluble substances, mentioned in column 4, can replace the sulfonate of the diazo compound and the phosphoric acid containing dextrine respectively in the above given example.

(3) An aqueous suspension of the diazo amino compound which is produced from the diazo compound of 4-amino-1-(N-2,6-dichlorobenzyl)-amino-benzene by reaction with guanidine nitrate in a soda solution is brushed on a cellulose acetate foil, which has been saponified on its surface to a depth of 10μ. This sensitive layer is coated with a film which is prepared by spreading on the layer a mixture, composed of 66 ccm. of a 6% aqueous polyvinyl alcohol solution and 34 ccm. of a 12% aqueous dextrine solution, and by immediately drying the coating. The exposure to light and the development of the resulting images is effected as described in Example 1.

(4) A cellulose acetate foil which has superficially been saponified, is bathed in a ½% aqueous solution of the zinc chloride double salt of selenopyronine having the formula

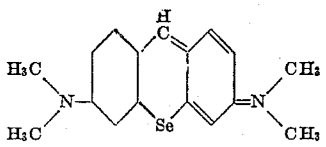

Subsequently the foil is coated with a 2% aqueous solution of the condensation product prepared from 1 mol. p-diazo-diphenylether, by reaction with 1 mol. paraformaldehyde in sulfuric acid of 60° Bé. and rubbed to dryness. The photo-sensitized foil is then brushed with a 6% aqueous solution of dextrine and redried. Exposure to light and development of the image is the same as described in Example 1.

In the following claims the expression "cellulosic foil" is intended to designate not only paper, the fibrous material, but also films which have been produced in known manner from derivatives of cellulose, for example, cellulose-xanthogenate and cellulose esters, which have been superficially saponified.

What we claim is:

1. The positive working process for producing lithographic printing plates from light sensitive material having a hydrophilic surface which has been photo-sensitized with a diazo compound of high molecular weight which upon direct exposure to light decomposes into a greasy ink receptive substance, said process comprising the steps of applying an aqueous colloidal solution of water soluble organic colloid to said sensitized hydrophilic surface to cover said sensitized surface with a water soluble organic colloid layer, exposing said sensitized hydrophilic surface provided with said water soluble colloid layer to a light image, removing said water soluble colloid layer and completely reexposing said sensitized hydrophilic surface to light.

2. The positive working process for producing lithographic printing plates from light sensitive material having a hydrophilic surface which has been photo-sensitized with a diazo compound of high molecular weight selected from the group consisting of diazo compounds of the general formula $$R—Y—Ar—N_2—X$$

wherein R is chosen from aryl, aralkyl, higher alkyl and aroyl residues,

Y is chosen from O, S, NH and $NR_1$, $R_1$ being chosen from alkyl, aralkyl and aryl, Ar is an aromatic residue, and X is an equivalent of an anion of an acid, their aldehyde condensation products, the sulfonates and diazo amino compounds of said diazo compounds and aldehyde condensation products, which process comprises the steps of applying an aqueous colloidal solution of water soluble organic colloid to said sensitized hydrophilic surface to cover said sensitized surface with a water soluble organic colloid layer, exposing said sensitized hydrophilic surface provided with said water soluble colloid layer to a light image, removing said water soluble colloid layer and completely reexposing said sensitized hydrophilic surface to light.

3. The positive working process for producing lithographic printing plates from light sensitive material having a hydrophilic surface which has been photo-sensitized with a diazo compound of high molecular weight which upon direct exposure to light decomposes into a greasy ink receptive substance, said process comprising the steps of applying an aqueous colloidal gum solution to said sensitized surface with a water soluble colloid gum layer, exposing said sensitized hydrophilic surface provided with said water soluble colloid gum layer to a light image, removing said water soluble colloid gum layer and completely reexposing said sensitized hydrophilic surface to light.

4. The positive working process for producing lithographic printing plates from light sensitive material having a hydrophilic surface which has been photo-sensitized with a diazo compound of high molecular weight which upon direct exposure to light decomposes into a greasy ink receptive substance, said process comprising the steps of applying an aqueous colloidal solution of gum arabic to said sensitized hydrophilic surface to cover said sensitized surface with a water soluble colloid layer comprising gum arabic, exposing said sensitized hydrophilic surface provided with said water soluble colloid layer to a light image, removing said water soluble colloid layer and completely reexposing said sensitized hydrophilic surface to light.

5. The positive working process for producing lithographic printing plates from light sensitive material having a hydrophilic surface which has been photo-sensitized with a diazo compound of high molecular weight which upon direct exposure to light decomposes into a greasy ink receptive substance, said process comprising the steps of applying an aqueous colloidal solution of mesquite gum to said sensitized hydrophilic surface to cover said sensitized surface with a water soluble colloid layer comprising mesquite gum, exposing said sensitized hydrophilic surface provided with said water soluble colloid layer to a light image, removing said water soluble colloid layer and completely reexposing said sensitized hydrophilic surface to light.

6. The positive working process for producing lithographic printing plates from light sensitive material having a hydrophilic surface which has been photo-sensitized with a diazo compound of high molecular weight which upon direct exposure to light decomposes into a greasy ink receptive substance, said process comprising the steps of applying an aqueous colloidal solution of dextrine to said sensitized hydrophilic surface to cover said sensitized surface with a water soluble colloid layer comprising dextrine, exposing said sensitized hydrophilic surface provided with said water soluble colloid layer to a light image, removing said water soluble colloid layer and completely reexposing said sensitized hydrophilic surface to light.

7. The positive working process for producing lithographic printing plates from light sensitive material having a hydrophilic surface which has been photo-sensitized with a diazo compound of high molecular weight which upon direct exposure to light decomposes into a greasy ink receptive substance, said process comprising the steps of applying an aqueous colloidal solution containing polyvinyl pyrrolidone to said sensitized hydrophilic surface to cover said sensitized surface with a water soluble colloid layer comprising polyvinyl pyrrolidone, exposing said sensitized hydrophilic surface provided with said water soluble colloid layer to a light image, removing said water soluble colloid layer and completely reexposing said sensitized hydrophilic surface to light.

8. The positive working process for producing lithographic printing plates from light sensitive material having a hydrophilic surface which has been photo-sensitized with a diazo compound of high molecular weight which upon direct exposure to light decomposes into a greasy ink receptive substance, said process comprising the steps of applying an aqueous colloidal solution to said sensitized hydrophilic surface to cover said sensitized surface with a water soluble colloid layer comprising a substance of the group consisting of gum arabic, cellulose ethers, polyuronic acids and their salts, dextrine, sugar, polyvinyl alcohol, polyvinyl pyrrolidine, water soluble urea resins, proteins, polyethylene oxide, pectin substances, sodium alginate, mesquite gum and guar resin, exposing said sensitized hydrophilic surface provided with said water soluble colloid layer to a light image, removing said water soluble colloid layer and completely reexposing said sensitized hydrophilic surface to light.

9. The positive working process for producing lithographic printing plates from light sensitive material having a hydrophilic surface which has been photo-sensitized with a diazo compound of high molecular weight which upon direct exposure to light decomposes into a greasy ink receptive substance, said process comprising the steps of applying an aqueous solution of dextrine containing Sirius light blue G to said sensitized hydrophilic surface to cover said sensitized surface with a water soluble colloid layer comprising dextrine, exposing said sensitized hydrophilic surface provided with said water soluble layer to a light image, removing said water soluble layer by washing with water containing Sirius light blue G and completely reexposing said sensitized hydrophilic surface to light.

WILHELM NEUGEBAUER.
JAKOB BARTHENHEIER.

References Cited in the file of this patent

UNITED STATES PATENTS

| Number | Name | Date |
|---|---|---|
| 2,312,852 | Toland | Mar. 2, 1943 |
| 2,316,148 | Bassist | Apr. 13, 1943 |
| 2,327,380 | Toland | Aug. 24, 1943 |
| 2,344,487 | Bassist | Mar. 21, 1944 |